May 14, 1968     P. O. T. STÅLBERG     3,383,140
ARRANGEMENT ON TRACKS FOR TRACTORS
Filed June 13, 1966
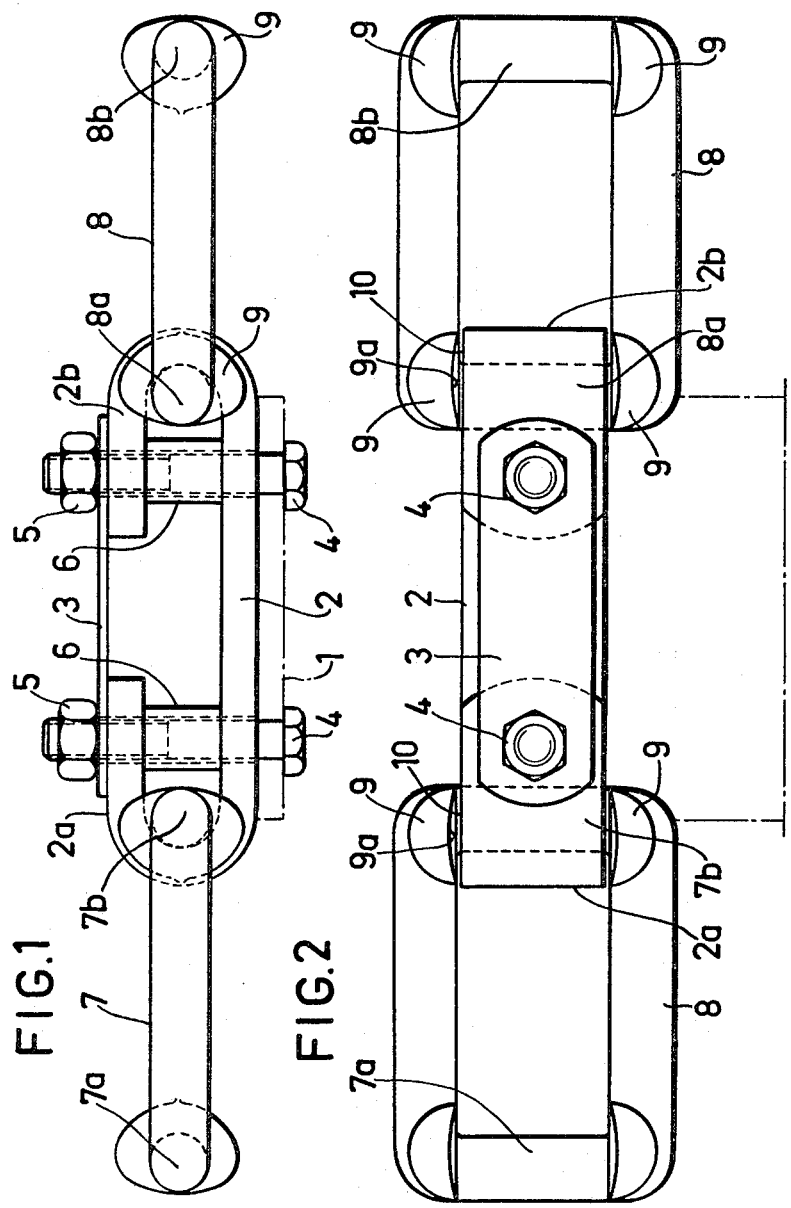

United States Patent Office 3,383,140
Patented May 14, 1968

3,383,140
ARRANGEMENT ON TRACKS FOR TRACTORS
Per Olov Torbjörn Stålberg, Edsbyn, Sweden, assignor to Ostbergs Fabriks AB Alfta, a Swedish joint-stock company
Filed June 13, 1966, Ser. No. 557,244
Claims priority, application Sweden, June 16, 1965, 7,960/65
2 Claims. (Cl. 305—54)

ABSTRACT OF THE DISCLOSURE

An endless track structure for driving ground engaging vehicles of the tractor type comprises a series of track plate units interconnected by links interposed therebetween. The track units include bars with curved end portions which are connected with the ends of the links, and shoulders are provided on the links adjacent the curved end portions of the bars to hold lateral deviations from the neutral line of the track within such a narrow limit as to prevent any run-off of the track.

---

The present invention is directed to an improved construction for an endless track which serves to drive a vehicle of the tractor type.

In recent times a great number of track constructions for tractors with rubber tires have been constructed and manufactured. The majority of these track constructions have been made of steel with a link system built up in the principle of hooks and links. The strength and wear resistance of these tracks have been satisfactory, but disturbances in operation due to the track sliding off of the wheels have caused certain difficulties and such as expensive stoppages.

The present invention is based on the observation that these track slides off of the wheels in most cases were due to the fact, that in the known constructions the link system, besides its flexibility about the peripheries of the wheels, also had a relatively great flexibility in lateral direction. As as result thereof, transverse force components can cause local lateral displacement of the track, for example in connection with the passing of natural obstacles striking only against one side of the track. This lateral deflection caused in the free part of the track between the wheel pair in question may easily result in that one wheel in the wheel pair rolls over the edge of the track and thereby causes the track to slide off the wheels.

This observed tendency is counteracted in that the arrangement according to the invention was given the characterizing features described hereinafter.

The invention is described in a greater detail in the following, reference being had to the accompanying drawing whereon FIGS. 1 and 2 show a side view and a top plan view respectively of a section of a track according to the invention.

The track plate 1 indicated by dash-dotted lines can be designed in different models according to tire type and operation requirements. It is supported by a bar 2 having its ends entirely bent over to form hooks 2a and 2b. The said hooks are bridged by a longitudinal spacer plate 3, the track plate as well as the spacer being fixed to the bar 2 by means of bolts 4. The bolts extend through corresponding holes in the straight portion of the bar, through its folded ends, the track plate and the spacer, on the outside of which spacer nuts 5 are screwed onto the said bolts. Each of the bolts is surrounded by a spacer sleeve 6 placed between the folded bar end in question and the straight portion of the bar. By tightening the nuts 5, the parts 1, 2, 3 and 6, thus, form a rigid unit.

Into each hook 2a and 2b one journal 7b and 8a respectively of a rectangular link 7 and 8 respectively is secured, the other journal 7a and 8b respectively being secured in corresponding hooks of adjacent bars also (not shown), which bars support track plates. Each of the journals 7a, 7b, 8a, 8b is provided at each end with a guide shoulder 9 having a planar or concave surface 9a which confronts a corresponding planar side surface 10 on the hook 2a and 2b respectively. The shoulders 9 on the links, as seen in FIG. 1 of the drawings are generally coextensive in area with the opposite planar side surfaces of the curvilinear part of the hooked end portions 2a, 2b of bars 2.

When, thus, a natural obstacle tries to bend out the track chain in lateral direction, i.e. when it tends to displace laterally one or several track plates 1 from its common central or neutral line, this displacing force is resisted by the abutment of the guide shoulders against the planar bar side surfaces in such a manner, that the deviations from the neutral line are held within such narrow limits that the risk of track run-off due to lateral deflection of the track is entirely eliminated.

As can be seen from the drawings, the rectangular links 7 and 8 have a circular cross-section on all four sides, and the journal portion 7b, 8a, which have a diameter somewhat less than the length of said spacer sleeves, i.e. less than the distance between the straight portion 2 and the opposite straight part of the curved end portion of the bar, are spaced somewhat from the spacer sleeves 6 to permit a restricted amount of longitudinal play therebetween to facilitate removal of mud.

The invention is not restricted to the afore-described embodiment, but different modifications can be imagined within the scope of the invention, particularly with respect to the design of the guide faces. The function of the guide shoulders shown, for example, could be taken over by the inner surfaces of link sides formed correspondingly wide. In general, the details shown can be replaced by elements of equivalent function.

What I claim is:
1. An endless track structure for driving a ground engaging vehicle of the tractor type comprising a series of track plate units interconnected by links interposed therebetween, each said track plate unit comprising a bar having a straight portion and hooked end portions having planar side surfaces, a track plate secured to said straight portion, and a link retaining bolt extending through each hooked end portion and the corresponding end portion of said bar and said track plate, each said link being of rectangular configuration and circular cross section, the ends of said links constituting journals and being received respectively within said hooked end portions of said bars and retained therein by said bolts, and each said link including enlarged shoulder portions on the upper and lower surfaces at each side of said journal end portions, said shoulder portions having substantially flat opposed side surfaces which are substantially co- extensive in area with and confronting the opposite planar side surfaces of the curvilinear part of said hooked end portions thereby to establish an abutment between said guide shoulders and the side surfaces of said hooked end portions and increase the resistance of said track plate units against a relative lateral displacement.

2. An endless track structure as defined in claim 1 and which further includes a spacer sleeve surrounding each said bolt within said hooked end portion of said bar and wherein the journal portions of said links are spaced from said sleeves to permit a limited longitudinal movement of said links relative to said track plate units.

References Cited

UNITED STATES PATENTS

| 214,735 | 4/1879 | Wheeler | 74—249 |
| 449,166 | 3/1891 | McCray | 305—50 X |
| 2,423,544 | 7/1947 | Acton | 305—56 |
| 2,999,723 | 9/1961 | Ostberg | 305—57 |

FOREIGN PATENTS 181,714  11/1962  Sweden.

RICHARD J. JOHNSON, *Primary Examiner.*